(12) United States Patent
Bittermann et al.

(10) Patent No.: US 6,938,738 B2
(45) Date of Patent: Sep. 6, 2005

(54) PRESSURE-MEDIUM OPERATED SPRING-PRESSURE BRAKE

(75) Inventors: Rainer Bittermann, Bergkamen (DE); Friedrich Tronicke, Urina (DE)

(73) Assignee: Stromag AG, Unna (DE)

( * ) Notice: Subject to any disclaimer, the term of this patent is extended or adjusted under 35 U.S.C. 154(b) by 0 days.

(21) Appl. No.: 10/808,968

(22) Filed: Mar. 25, 2004

(65) Prior Publication Data

US 2004/0188194 A1 Sep. 30, 2004

(30) Foreign Application Priority Data

Mar. 27, 2003 (DE) .......................................... 103 14 691

(51) Int. Cl.[7] .............................................. F16D 59/02
(52) U.S. Cl. ...................................... 188/170; 188/71.5
(58) Field of Search ................................. 188/170, 171, 188/166, 72.3, 366, 367, 71.5, 264 E, 71.6; 303/71, 9.76; 92/63, 130 A; 192/70.27, 91 R, 70.2

(56) References Cited

U.S. PATENT DOCUMENTS

| | | | |
|---|---|---|---|
| 4,057,297 A | | 11/1977 | Beck et al. |
| 4,245,724 A | | 1/1981 | Beck |
| 4,610,331 A | * | 9/1986 | Rogier et al. .............. 188/18 A |
| 5,050,710 A | * | 9/1991 | Bargfrede ................... 188/71.6 |
| 5,099,964 A | * | 3/1992 | Cunningham et al. ...... 188/170 |
| 6,206,163 B1 | | 3/2001 | Schneider |
| 2003/0150674 A1 | * | 8/2003 | Daigre ....................... 188/71.5 |

FOREIGN PATENT DOCUMENTS

| | | |
|---|---|---|
| DE | 101 30 930 | 1/2003 |
| DE | 10314691 A1 * | 10/2004 |
| EP | 1 067 305 | 1/2001 |
| GB | 2 123 502 | 2/1984 |
| GB | 2 239 907 | 7/1991 |

OTHER PUBLICATIONS

German language German Examination Report Feb. 18, 2004 (3 sheets).

* cited by examiner

*Primary Examiner*—Douglas C. Butler
(74) *Attorney, Agent, or Firm*—Flynn, Thiel, Boutell & Tanis, P.C.

(57) ABSTRACT

A spring-pressure brake includes a brake housing which has an outside body, and into which are integrated a disk-brake arrangement, an axially movable brake-piston arrangement and a pressure-spring system acting onto the brake-piston arrangement. The outside body is designed as a one-piece hollow body that extends over the entire axial length of the spring-pressure brake and is used for hydraulic disk spring-pressure brakes.

13 Claims, 1 Drawing Sheet

PRESSURE-MEDIUM OPERATED SPRING-PRESSURE BRAKE

FIELD OF THE INVENTION

The invention relates to a pressure-medium operated spring-pressure brake comprising a brake housing, which has an outside body and into which are integrated a disk-brake arrangement, an axially movable brake-piston arrangement and a pressure-spring system acting onto the brake-piston arrangement.

BACKGROUND OF THE INVENTION

Such a spring-pressure brake is known in the form of a hydraulic disk spring-pressure brake under the name "KMB" by the Stromag AG company. The known disk spring-pressure brake has as the disk-brake arrangement a disk package consisting of a plurality of axially movable adjoining disks. A portion of the disks is connected on the side of the housing and another portion of the disks is connected to a shaft which is to be stopped. The disk package can be axially loaded by a brake-piston arrangement so that the corresponding braking action can be achieved by friction forces between the disks. The brake-piston arrangement is axially transferred into the braking position by the spring forces of a pressure-spring system, and by a venting of the hydraulic pressurization of the brake-piston arrangement position. The various operating parts of the brake are surrounded by a brake housing, which is designed with multiple parts.

The purpose of the invention is to provide a spring-pressure brake of the above identified type, which has a simplified design and requires less installation input.

SUMMARY OF THE INVENTION

This purpose is attained by the outside body being designed as a one-piece hollow body and extending over the entire axial length, with reference to a brake axis of rotation. By designing the outside body as a one-piece hollow body, which extends over the entire axial brake length, a housing sleeve is created which can be easily manufactured and is strong, and into which can be installed the various operating parts from the open ends of the hollow body. On the one hand, this results in a reduced number of component parts for the manufacture of the spring-pressure brake. On the other hand, the mounting of the spring-pressure brake is simplified.

The outside body has in a further development of the invention at each of its opposite open end areas and on the insides thereof an annular groove for reception of an axial retaining ring, between which the disk-brake arrangement, the brake-piston arrangement and the pressure-spring system are arranged. From this results an extremely easy installation, since the various operating parts, including the disk-brake arrangement, the brake-piston arrangement and the pressure-spring system are axially inserted into the opposite open and into the outside body, are moved into the operating position and finally the respective outer operating parts are axially fixed by the respective axial retaining ring.

The outside body has in a further development of the invention at both axial end areas radially outwardly projecting flange sections which have fastening receiving means for connection to fastening means of adjoining component parts. Thus, a reliable connection to respective fastening areas of adjacent component parts is created by simple means.

The inventive spring-pressure brake can be operated by various pressure-medium types. These are correspondingly suitable gases and liquids which are under pressure. Particularly advantageous is hydraulic oil as a pressure medium so that the spring-pressure brake can be hydraulically operated.

The outside body is in a further development of the invention designed as a metal casting. The outside body is in a preferred, extremely robust construction manufactured out of gray cast iron. The outside body is in other constructions designed as a light-metal casting.

BRIEF DESCRIPTION OF THE DRAWINGS

Further advantages and characteristics of the invention result from the claims and from the following description of a preferred exemplary embodiment of the invention, which is illustrated in the drawings, in which:

DETAILED DESCRIPTION

Figure 1:
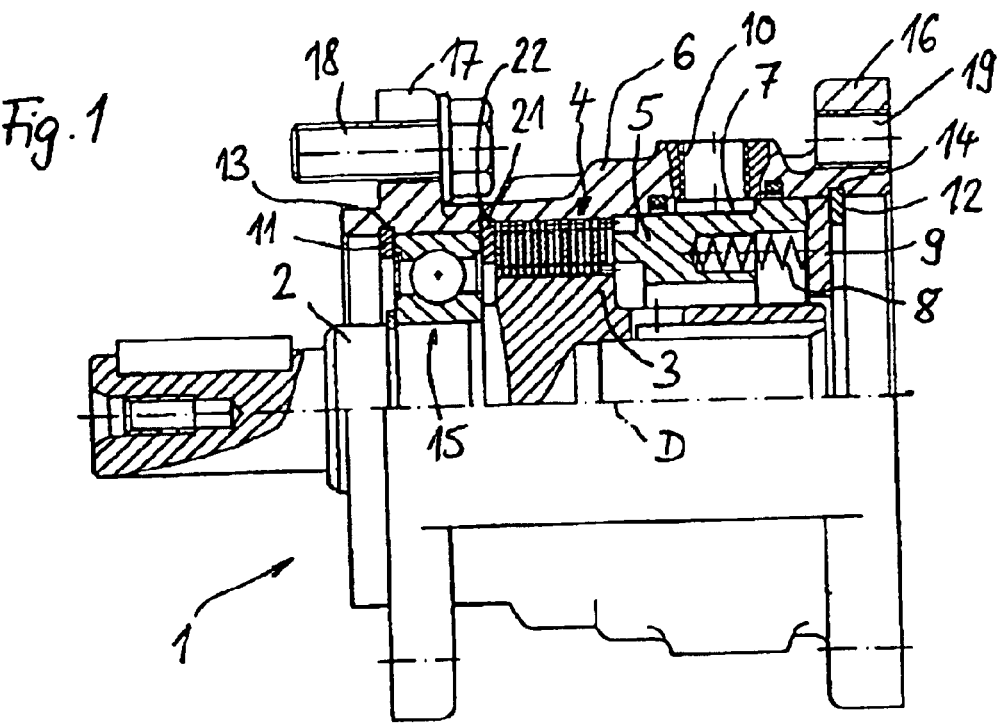
FIG. 1 is a central longitudinal cross-sectional view of an embodiment of an inventive spring-pressure brake.
Figure 2:
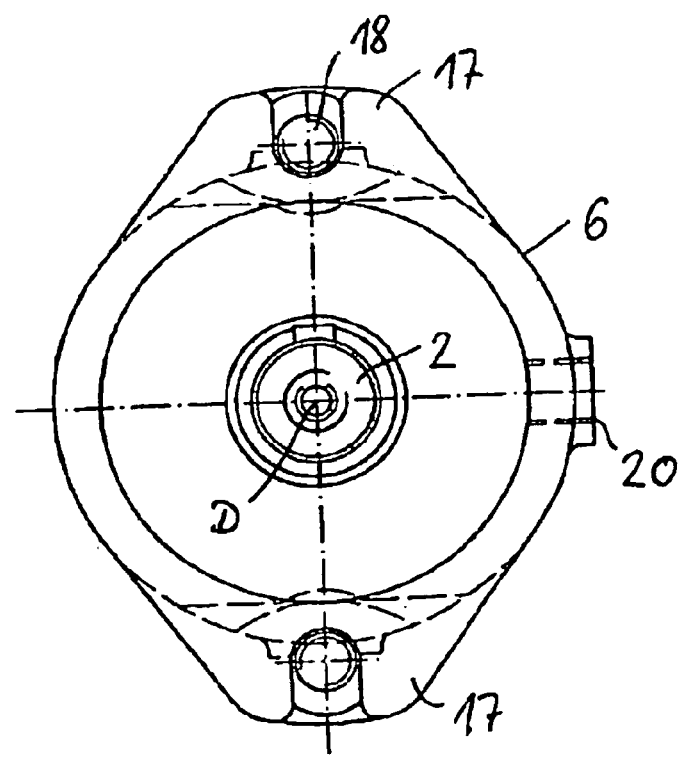
FIG. 2 is a left end view of the spring-pressure brake according to FIG. 1.

A spring-pressure brake 1 according to FIGS. 1 and 2 is hydraulically operated in a manner which will be described in greater detail hereinafter. The spring-pressure brake is used to brake a hydromotor not illustrated in detail. The spring-pressure brake 1 has for this purpose a brake shaft 2 which is rotatably movably supported about an axis of rotation D. The brake shaft 2 can be connected at the front left end in a manner not illustrated in detail to a corresponding drive for the hydromotor in order to achieve a power transfer from the spring-pressure brake 1 onto the hydromotor. The brake shaft 2 is supported by means of a roller-bearing arrangement 15 in a brake housing, which is essentially defined by an outside body 6 designed as a one-piece hollow body. The outside body 6 is designed as a one-piece metal casting and has an essentially hollow cylindrical configuration. The outside body 6 is designed essentially rotationally symmetrically with respect to the axis of rotation D but for the flange sections 16, 17, which will be described in greater detail hereinafter. The inside of the outside body 6 is open toward both axial ends. The braking shaft 2 extends coaxially into the inside of the outside body 6. Axially following the described roller-bearing arrangement 15 for the rotational support of the brake shaft 2, the brake shaft 2 has a brake hub 3 which has an external tooth system for the axial guiding of disks of a disk package 4 serving as a disk-brake arrangement. Disks are positioned between each of the disks rotationally lockingly connected to the brake hub 3, which disks are held fixed against rotation, however, are axially movable on the inner circumference of the outside body 6. The axial mobility of the disks of the disk package 4 is defined on a side facing the front left end directly adjacent to the roller-bearing arrangement 15 by a brake ring 21 which is axially secured in an annular groove 22 in the inner circumference of the outside body 6. The disk package 4 can on the opposite axial end thereof be axially loaded by a brake-piston arrangement 5, in the present case by an annular brake piston, for a braking operation. The brake-piston arrangement 5 is axially movably supported on the inner circumference of the outside body 6.

A piston chamber 7 is defined between an outer-sleeve section of the brake-piston arrangement 5 and a corresponding inner-circumference section of the outside body 6, which piston chamber 7 communicates with a hydraulic connection 10 oriented radially outwardly therefrom and relative to the axis of rotation D. The hydraulic connection 10 is provided on the outside body 6.

The brake-piston arrangement 5 is axially pressurized in direction of the disk package 4 by a pressure-spring system 8 consisting in the present case of several compression springs. The brake-piston arrangement 5 can be shifted against the pressure forces of the pressure-spring system 8 by suitable hydraulic pressurization of the piston chamber 7. The compression springs of the pressure-spring system 8 are held in corresponding receiving means which are distributively arranged over the circumference of the brake-piston arrangement 5 and are aligned on parallel axes. The compression springs are supported on a support ring 9 at their ends remote from the disk package 4. The support ring 9 has an outside diameter which corresponds approximately to the inside diameter of the outside body 6 in the area of the corresponding inner-circumference section. The support ring 9 is axially supported on the right side thereof by an axial retaining ring 12 held in an annular groove 14 of the outside body 6. The axial retaining ring 12 forms an axial lock for the operating parts within the outside body 6 at the right end area of the outside body 6. The left end axial retaining ring 11, which is held in the annular groove 13 of the receiving body 6, supports the roller-bearing arrangement 15, which in turn is followed axially flush by the brake ring 21 for the disk package 4.

The outside body 6 has on the outside thereof in the area of both of its ends two radially outwardly projecting flange sections 16 and 17 which serve as fastening flanges for suitably securing the spring-pressure brake 1 to component parts. Several fastening receiving means in the form of tapholes 19 are for this purpose provided in the right end flange section 16. The two flange sections 17, which are diametrically opposite one another relative to the axis of rotation D, each have on an edge thereof a groove-like or slot-like receiving means to facilitate a guiding of fastening screws 18 therethrough.

The spring-pressure brake 1 has in the described design a one-piece, hollow-cylindrical-like outside body 6, the inside of which is open toward both ends. The spring-pressure brake 1 is preferably mounted so that the brake shaft 2 is initially centered in the outside body 6 by means of the roller-bearing arrangement 15. The roller-bearing arrangement 15 is fixed relative to the outside body 6 by means of the axial retaining ring 11 on the one side thereof and the brake ring 21 on the other side thereof. The roller-bearing arrangement 15 is secured on the brake shaft 2 on the right side thereof by a suitable, not in detail identified annular shoulder of the brake hub 3 and on the left side by a retaining ring (not identified in detail). The disk package 4 is subsequently mounted from the right end of the outside body 6 radially between the brake hub 3 and the respective internal tooth system of the outside body 6. The brake-piston arrangement 5 is inserted following the disk package 4, after suitable sealing rings (not identified in detail) have first been inserted on the inner circumference of the outside body 6 to define and seal off the piston chamber 7. After the axial insertion of the compression springs of the pressure-spring system 8, the support ring 9 is inserted during a simultaneous compressing, that is initial tension, of the pressure-spring system 8 axially from the right end of the outside body 6, and is secured in its position resting on a right facing surface of the brake-piston arrangement 5 by the finally inserted axial retaining ring 12. The spring-pressure brake 1 is now finished and can be mounted on the respectively adjoining components. The respective hydraulic connections are lastly created by connecting hydraulic lines to the hydraulic connection 10 for supplying oil and a hydraulic connection 20 for discharging oil.

What is claimed is:

1. A pressure-medium operated spring-pressure brake comprising a brake housing which has an outside body and into which are integrated a disk-brake arrangement, an axially movable brake-piston arrangement and a pressure-spring system acting onto the brake-piston arrangement, the outside body comprising a one-piece hollow body extending over an entire axial length with reference to a brake axis of rotation of the spring-pressure brake and having at each opposite, open end area on the inside thereof an annular groove for reception of an axial retaining ring, between which are arranged the disk-brake arrangement, the brake-piston arrangement, and the pressure-spring system, wherein the outside body includes radially outwardly projecting flange sections at both axial end areas, said flange sections having fastener receivers.

2. The spring-pressure brake according to claim 1, wherein the outside body comprises a metal casting.

3. A pressure-medium operated spring-pressure brake comprising a brake housing which has an outside body and into which are integrated a disk-brake arrangement, an axially movable brake-piston arrangement and a pressure-spring system acting onto the brake-piston arrangement, the outside body comprising a one-piece hollow body extending over an entire axial length with reference to a brake axis of rotation of the spring-pressure brake and having at each opposite, open end area on the inside thereof an annular groove for reception of an axial retaining ring, between which are arranged the disk-brake arrangement, the brake-piston arrangement, and the pressure-spring system, wherein the outside body is provided with at least one pressure-medium connection for facilitating pressurization of the brake-piston arrangement.

4. The spring-pressure brake according to claim 3, wherein the outside body comprises a metal casting.

5. A pressure-medium operated spring-pressure brake comprising:

a brake shaft including a brake hub, said brake shaft having a length and rotatable about a central brake shaft axis thereof;

a one-piece fixed hollow brake housing having open ends and defining an essentially cylindrical inner chamber, said brake housing including first and second annular grooves adjacent the open ends of the inner chamber, and a radially outwardly oriented opening for receiving a fluid, said one-piece hollow brake housing receiving said brake shaft and having a central axis corresponding to the brake shaft axis, said one-piece hollow brake housing receiving said brake hub therein;

a disc brake arrangement including a disc package, said disc brake arrangement located within said one-piece hollow brake housing, said disc package including axially movable discs;

an axially movable brake-piston arrangement located within said one-piece hollow brake housing and including a piston chamber adjacent the radially oriented opening;

a pressure-spring system located within said one-piece hollow brake housing for acting on the brake-piston arrangement;

a roller-bearing arrangement located within said one-piece hollow brake housing for enabling said brake shaft to rotate relative to said fixed one-piece hollow brake housing;

a first axial retaining ring inserted in the first annular groove for retaining said disc brake arrangement, said movable brake-piston arrangement and said roller-bearing arrangement within said one-piece hollow brake housing; and a second axial retaining ring inserted in the second annular groove for retaining said disc brake arrangement, said movable brake-piston arrangement and said roller-bearing arrangement within said one-piece hollow brake housing, wherein at least part of said first axial retaining ring, said roller-bearing arrangement, said disc brake arrangement, said brake-piston arrangement and said second axial retaining ring are in axial alignment with each other.

6. The spring-pressure brake according to claim 5, the one-piece hollow brake housing including outwardly projecting flange sections at both ends thereof, said flange sections including fastener receiving openings.

7. The spring-pressure brake according to claim 5, wherein the one-piece hollow brake housing comprises a metal casting.

8. The spring-pressure brake according to claim 5, including a support ring located between said brake-piston arrangement and said second axial retaining ring.

9. The spring-pressure brake according to claim 8, said one-piece hollow brake housing further comprising a braking annular groove extending about the circumference of the inner chamber and said disc brake arrangement comprising a brake ring, wherein said brake ring is located in the braking annular groove.

10. The spring-pressure brake according to claim 5, said one-piece hollow brake housing further comprising a braking annular groove extending about the circumference of the inner chamber, and said disc brake arrangement comprising a brake ring, wherein said brake ring is located in the braking annular groove, and said disc brake arrangement and said brake-piston arrangement are located between said brake ring and said second axial retaining ring.

11. The spring-pressure brake according to claim 5, said disc package comprising a first group of discs lockingly connected to and rotatable with the brake hub and a second group of discs rotatably fixed to the hollow brake housing.

12. The spring-pressure brake according to claim 5, wherein said first and second annular grooves extend about the circumference of the inner chamber.

13. The spring-pressure brake according to claim 5, wherein the one-piece hollow brake housing is provided with at least one pressure-medium connection for facilitating pressurization of the brake-piston arrangement.

* * * * *